(12) United States Patent
Mallikarjunan et al.

(10) Patent No.: US 8,914,008 B2
(45) Date of Patent: Dec. 16, 2014

(54) SETTING UP COMMUNICATIONS FORWARDING

(71) Applicant: Apple Inc., Cupertino, CA (US)

(72) Inventors: Raghuveer Mallikarjunan, San Jose, CA (US); Wael S. Barakat, Sunnyvale, CA (US)

( * ) Notice: Subject to any disclaimer, the term of this patent is extended or adjusted under 35 U.S.C. 154(b) by 0 days.

(21) Appl. No.: 13/719,164

(22) Filed: Dec. 18, 2012

(65) Prior Publication Data

US 2014/0171049 A1  Jun. 19, 2014

(51) Int. Cl.
*H04W 4/00* (2009.01)
*H04W 4/16* (2009.01)

(52) U.S. Cl.
CPC ...................................... *H04W 4/16* (2013.01)
USPC .......................................... 455/417; 455/558

(58) Field of Classification Search
USPC ............ 455/403, 415, 417, 452.1, 452.2, 558
See application file for complete search history.

(56) References Cited

U.S. PATENT DOCUMENTS

| | | | |
|---|---|---|---|
| 6,556,823 B2 | 4/2003 | Clapton et al. | |
| 7,991,394 B2 | 8/2011 | Gonen et al. | |
| 2005/0100145 A1* | 5/2005 | Spencer et al. | 379/88.22 |
| 2008/0064443 A1* | 3/2008 | Shin et al. | 455/558 |
| 2010/0048197 A1* | 2/2010 | Jiang | 455/422.1 |
| 2012/0135715 A1 | 5/2012 | Kang et al. | |
| 2013/0065570 A1* | 3/2013 | Jung et al. | 455/417 |

FOREIGN PATENT DOCUMENTS

KR  2004013258 A  12/2004

* cited by examiner

*Primary Examiner* — Myron K Wyche
(74) *Attorney, Agent, or Firm* — Womble Carlyle Sandridge & Rice, LLP

(57) ABSTRACT

A method for setting up communications forwarding is provided. The method can include determining that a wireless communication device having a first telephone number associated with a first country is being operated in a second country and that a second telephone number associated with the second country has been activated on the wireless communication device. The method can further include, responsive to the determination, sending a forwarding request from the wireless communication device to a network to request activation of forwarding of communications directed to the first telephone number to the second telephone number.

22 Claims, 6 Drawing Sheets

SETTING UP COMMUNICATIONS FORWARDING

FIELD OF THE DESCRIBED EMBODIMENTS

The described embodiments relate generally to wireless communications.

BACKGROUND

A wireless communication device can be provisioned with a telephone number that can be used to contact the device for directing phone calls and/or other communications to the device. For example, a device can be provisioned with a first telephone number associated with a home country in which the device is operated, and the first telephone number can be used by the device when operating on a home network in the home country.

Some wireless communication devices can be used for international roaming. As such, a wireless communication device provisioned with a first telephone number associated with the device's home country can be operated in a foreign country that a user of the wireless communication device may be visiting. When in the foreign country, a user of the wireless communication device may opt to use a second telephone number associated with the foreign country so as to obtain a better rate for calls placed in the visited foreign network, to achieve device compatibility with the visited foreign network, and/or for other reasons. For example, the user can activate a subscriber identity module (SIM) having an association with the second telephone number on his or her device for use on the visited foreign network. When the second telephone number is activated on the wireless communication device in place of the first telephone number, the device may not receive communications directed to the first telephone number, as the first telephone number may not be registered to the visited foreign network. As such, a user of the wireless communication device may desire to have communications directed to the first telephone number forwarded to the second telephone number so that they may be received by the device while the device is being operated in the visited foreign network with the second telephone number.

SUMMARY OF THE DESCRIBED EMBODIMENTS

Some embodiments disclosed herein provide for setting up communications forwarding in international roaming and/or other scenarios. A wireless communication device may be associated with a first telephone number for use in a first country. The device may determine that the device is being operated in a second country and that a second telephone number has been activated on the device for use in the second country. In response to this determination, the wireless communication device may send a forwarding request to request the forwarding of communications that would typically be directed to the first telephone number to the second telephone number. Thus, communications forwarding to the second telephone number may be configured without requiring a user to manually initiate communications forwarding when roaming internationally with a second telephone number.

The above summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Figure 1:
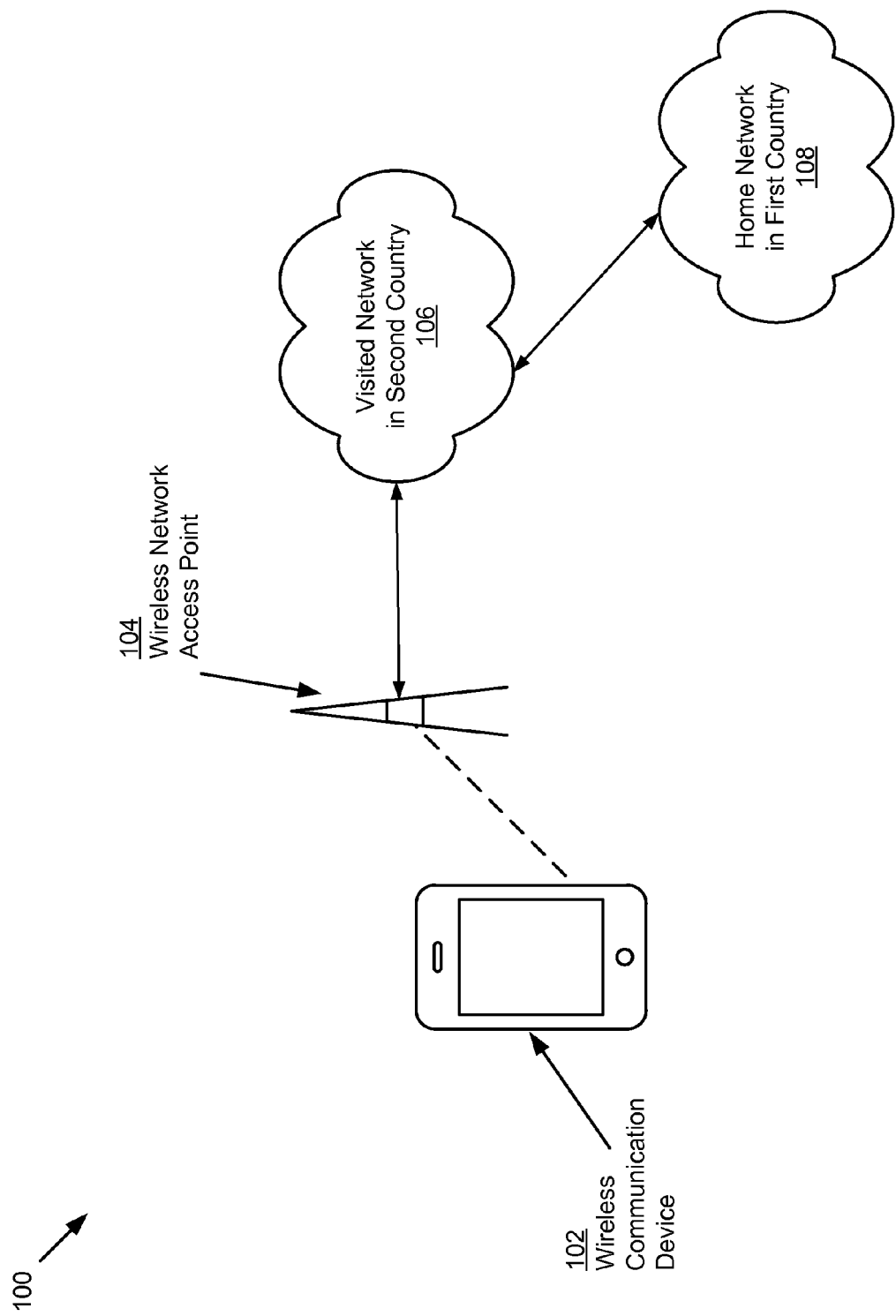
FIG. 1 illustrates a system in accordance with some example embodiments.

Representative applications of systems, methods, apparatuses, and computer program products according to the present disclosure are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

When roaming internationally, a user of a wireless communication device can activate a second telephone number on the wireless communication device for use on the visited foreign network. For example, the user can switch from a SIM associated with the device's home network in the user's home country to a SIM associated with the visited foreign network. As such, a first telephone number that is associated with the device's home network in the user's home country may not be registered to the visited foreign network and communications directed to the first telephone number may not be received by the device while operating on the visited foreign network without configuring forwarding from the first telephone number to the second telephone number.

Some example embodiments provide for setting up communications forwarding in such international roaming scenarios. In this regard, some example embodiments provide a wireless communication device having a first telephone number associated with a first country that is configured to format and send a forwarding request to request activation of forwarding of communications directed to the first telephone number to a second telephone number in an instance in which the device determines that the device is being operated in a second country and that the second number has been activated on the device for use in the second country. In some such example embodiments, the wireless communication device can determine that it is in such an international roaming scenario automatically. As such, communications forwarding to the second telephone number can be configured in some example embodiments without requiring a user to manually initiate communications forwarding when roaming internationally with a second telephone number. Accordingly, some example embodiments avoid imposing a burden on a user to have knowledge of how to set up communication forwarding and to remember to set up configuration forwarding in international roaming scenarios.

FIG. 1 illustrates a system 100 in accordance with some example embodiments. The system 100 can include a wireless communication device 102. The wireless communication device 102 can be a cellular phone, such as a smart phone device, a tablet computing device, a laptop computing device, or other computing device configured to operate within a wireless network, such as by way of non-limiting example a cellular network.

The wireless communication device 102 can have a first telephone number that can be associated with a home network 108 in a first country. The first telephone number can, for example, be tied to a network access credential associated with the home network 108 and/or the first country which has been provisioned to the wireless communication device 102. Such network access credential can take a variety of forms and, in some example embodiments, can be a SIM and/or contents that can be carried by a SIM, such as an Internet Mobile Subscriber Identity (IMSI). A SIM that can be used by a wireless communication device 102, and which can provide or carry a network access credential in accordance with various example embodiments can include, by way of non-limiting example, an embedded SIM, a SIM card, or other form of SIM.

The wireless communication device 102 can be located in a second country and can access a visited network 106 in the second country via the wireless network access point 104. The wireless network access point 104 can, for example, be a cellular base station, such as a base station (BS), base transceiver station (BTS), node B, evolved node B (eNB), or other base station that can provide access to a cellular network.

When the wireless communication device 102 is operated in the second country and is connected to the visited network 106, the wireless communication device 102 can use a second telephone number that can be associated with the visited network 106 in the second country. As such, the first telephone number may not be registered to the visited network 106. In this regard, the wireless communication device 102 can be roaming internationally in the second country.

The visited network 106 and home network 108 can each comprise any type of cellular network. By way of non-limiting example, the visited network 106 and home network 108 can each comprise a Long Term Evolution (LTE) network, LTE-Advanced (LTE-A) network, a Universal Mobile Telecommunications System (UMTS) network (e.g., a Wideband Code Division Multiple Access (WCDMA), a Time Division Synchronous Code Division Multiple Access (TD-SCDMA) network, and/or other UMTS network), a CDMA2000 network, a 1xRTT network, and/or other cellular network.

The wireless network access point 104 and/or other entity on the visited network 106 can communicate with one or more entities on the home network 108. In this regard, the visited network 106 and home network 108 can be coupled either directly or via one or more intermediary networks to enable internetwork communication between the visited network 106 and home network 108. As such, when communications forwarding is set up in accordance with one or more example embodiments, a communication directed to a first telephone number associated with the home network 108 in the first country can be forwarded to a second telephone number that can be used by the wireless communication device 102 on the visited network 106 in the second country.

Figure 2:
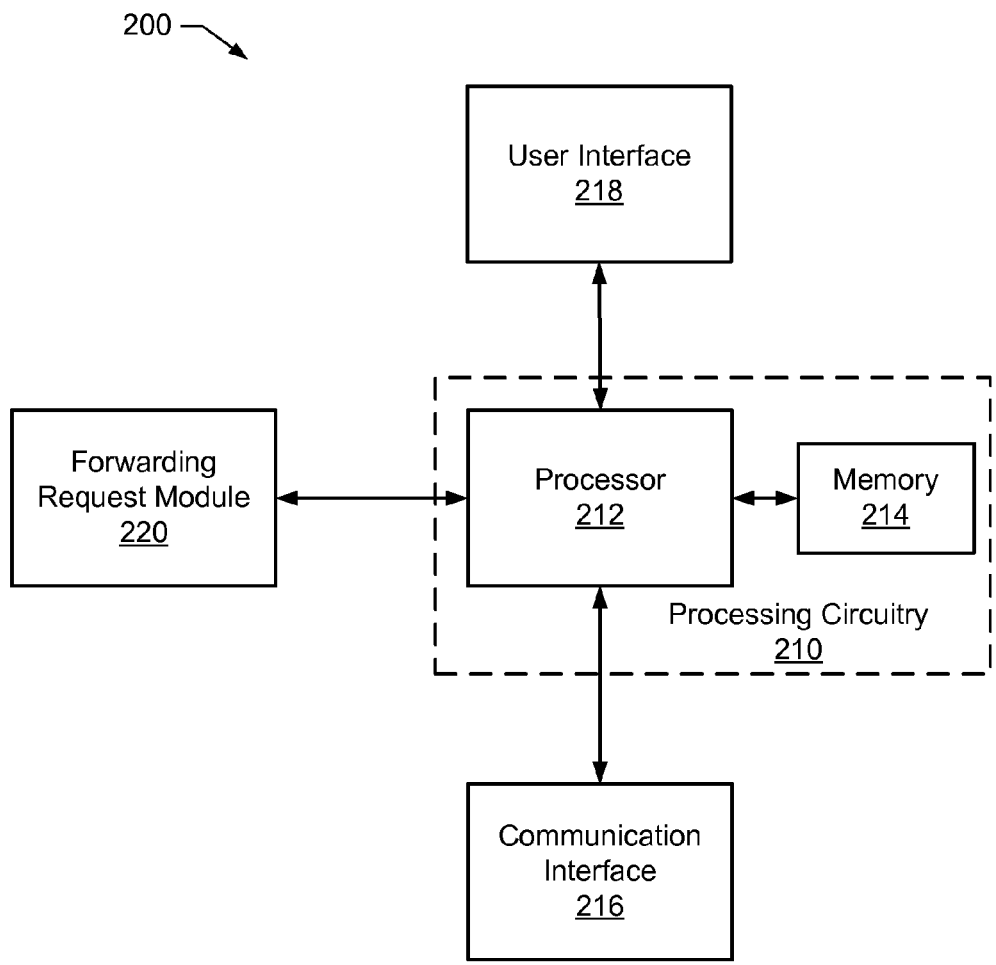
FIG. 2 illustrates a block diagram of an apparatus that can be implemented on a wireless communication device in accordance with some example embodiments.

FIG. 2 illustrates a block diagram of an apparatus 200 that can be implemented on a wireless communication device 102 in accordance with some example embodiments. In this regard, when implemented on a computing device, such as wireless communication device 102, apparatus 200 can enable the computing device to operate within the system 100 in accordance with one or more example embodiments. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of the apparatus 200 in accordance with various example embodiments, and thus can provide means for performing functionalities of the apparatus 200 in accordance with various example embodiments. The processing circuitry 210 can be configured to perform data processing, application execution and/or other processing and management services according to one or more example embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a chipset including one or more chips. In some example embodiments in which one or more components of the apparatus 200 are embodied as a chipset, the chipset can be capable of enabling a computing device to operate in the system 100 when implemented on or otherwise operably coupled to the computing device. Thus, for example, one or more components of the apparatus 200 can provide a chipset configured to enable a computing device to operate on a cellular network.

In some example embodiments, the processing circuitry 210 can include a processor 212 and, in some embodiments, such as that illustrated in FIG. 2, can further include memory 214. The processing circuitry 210 can be in communication with or otherwise control the communication interface 216, user interface 218, and/or the forwarding request module 220.

The processor 212 can be embodied in a variety of forms. For example, the processor 212 can be embodied as various processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the apparatus 200 as described herein. In some example embodiments, the processor 212 can be configured to execute instructions that can be stored in the memory 214 or that can be otherwise accessible to the processor 212. As such, whether configured by hardware or by a combination of hardware and software, the processor 212 can be capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments, the memory 214 can be in communication with one or more of the processor 212, communication interface 216, user interface 218, or forwarding request module 220 via a bus(es) for passing information among components of the apparatus 200.

The apparatus 200 can further include a communication interface 216. The communication interface 216 can include one or more interface mechanisms for enabling communication with other devices and/or networks. For example, the communication interface 216 can include a transceiver configured to enable the apparatus 200 to send wireless signals to and receive signals from a wireless network. In this regard, the communication interface 216 can be configured to enable the wireless communication device 102 to send signals to and receive signals from the wireless network access point 104. As such, the communication interface 216 can be configured to support any type of cellular or other wireless communication technology that may be implemented by the wireless network access point 104. In various example embodiments, the communication interface 216 can additionally or alternatively include, for example, an antenna (or multiple antennas) and supporting hardware and/or software for enabling communications with one or more further wireless communication networks (e.g., a cellular network, wireless local area network, and/or the like) and/or a communication modem or other hardware/software for supporting communication via cable, digital subscriber line (DSL), USB, FireWire, Ethernet or other wireline networking methods.

The user interface 218 (if implemented on the apparatus 200) may be in communication with the processing circuitry 210 to receive an indication of a user input at the user interface 218 and/or to provide an audible, visual, mechanical or other output to the user. As such, the user interface 218 may include, for example, a keyboard, a mouse, a joystick, a display, a touch screen, a microphone, a speaker, and/or other input/output mechanisms. In some example embodiments in which the user interface 218 is implemented on the apparatus 200, the user interface 218 can be used to provide notifications, such as a notification of a detected international roaming scenario, to a user of the wireless communication device 102. Additionally or alternatively, the user interface 218 can be used to receive user input, such as user consent to configure communication forwarding, user selection of a communication type(s) to be forwarded, and/or other user input that may be used to set up communication forwarding in accordance with one or more example embodiments.

The apparatus 200 can further include forwarding request module 220. The forwarding request module 220 can be embodied as various means, such as circuitry, hardware, a computer program product comprising computer readable program instructions stored on a computer readable medium (for example, the memory 214) and executed by a processing device (for example, the processor 212), or some combination thereof. In some embodiments, the processor 212 (or the processing circuitry 210) can include, or otherwise control the forwarding request module 220.

The forwarding request module 220 of some example embodiments can be configured to detect that the wireless communication device 102 is operating in an international roaming scenario. In this regard, the forwarding request module 220 can be configured to determine that the wireless communication device 102 is being operated in the second country on the visited network 106 and that a second telephone number associated with the second country has been activated in place of the first telephone number associated with the home network 108 in the first country. In this scenario, the second telephone number can be registered to the visited network 106, but the first telephone number may not be. Accordingly, communications directed to the first telephone number may not be receivable by the wireless communication device 102 unless they are forwarded to the second telephone number.

In some such example embodiments, the forwarding request module 220 can be configured to distinguish between such an international roaming scenario and other scenarios in which communications forwarding may not be desired, such as a scenario in which the user of the wireless communication device 102 has moved to the second country and forfeited the first telephone number or a scenario in which the wireless communication device 102 has been transferred to a user in the second country. For example, if the first telephone number has been deprovisioned or otherwise erased from the wireless communication device 102, such as through deprovisioning of a SIM and/or other network access credential associated with the first telephone number prior to activation of the second telephone number, the forwarding request module 220 can determine that the wireless communication device 102 is not in an international roaming scenario in which communications forwarding may be desired.

Additionally or alternatively, in some example embodiments, the forwarding request module 220 can be configured to solicit user confirmation that the wireless communication device 102 is in an international roaming scenario for which communications forwarding from the first telephone number to the second telephone number is desired in an instance in which the forwarding request module 220 has determined that the wireless communication device 102 is being operated in the second country on the visited network 106 and that a second telephone number associated with the second country has been activated in place of the first telephone number associated with the home network 108 in the first country. For example, a prompt may be presented on a display of the user interface 218 for the user to confirm that forwarding of communications from the first telephone number to the second telephone number is desired. If the user does not wish for communications to be forwarded, then the forwarding request module 220 may not initiate a forwarding request. If, however, the user selects that forwarding is desired, the forwarding request module 220 can determine that the wireless communication device 102 is in an international roaming scenario for which communications forwarding should be set up.

The forwarding request module 220 of some example embodiments can be configured to format and send a forwarding request to request activation of forwarding of communications directed to the first telephone number to the second telephone number in an instance in which the forwarding request module 220 determines that the wireless communication device 102 is in an international roaming scenario for which forwarding is desired. By way of non-limiting example, communications that can be forwarded to the second telephone number based on the request can include one or more of phone calls, text messages, voicemails, and/or other communication types.

The forwarding request can, for example, be sent to the visited network 106. An entity in the visited network 106 can forward the request to or otherwise coordinate with an entity in the home network 108 so that a communication directed to the first telephone number is forwarded from the home network 108 to the visited network 106 such that it can be delivered to the wireless communication device 102 via the second telephone number. It will be appreciated, however, that embodiments are not limited to the wireless communication device 102 sending a forwarding request to the visited network 106 via the wireless network access point 104. For example, in some example embodiments, a forwarding request can be sent via another network, such as a wireless local area network and/or other network connection that can be available to the wireless communication device 102. Further, in some example embodiments, a forwarding request can be sent via a wireline network connection.

The forwarding request can be formatted by the forwarding request module 220 in accordance with a format that can be used by the visited network 106 and/or home network 108. In some example embodiments, the forwarding request module 220 can be configured to ascertain an appropriate format for the forwarding request such that the forwarding request module 220 can be configured to format and send forwarding requests in accordance with multiple standards that can be implemented in various countries and/or on various networks. Further, depending on the network, the forwarding request can be directed to any of a variety of network entities, including, by way of non-limiting example, the wireless network access point 104, a mobility management entity (MME), a core network entity, and/or other entity.

In some example embodiments, the forwarding request can be formatted by the forwarding request module 220 to include an indication that the forwarding request has been sent from the first telephone number (e.g., the telephone number registered to or otherwise associated with the home network 108 in the first country). However, the forwarding request can be sent using the second telephone number (e.g., the telephone number registered to or otherwise associated with the visited network 106 in the second country).

Figure 3:
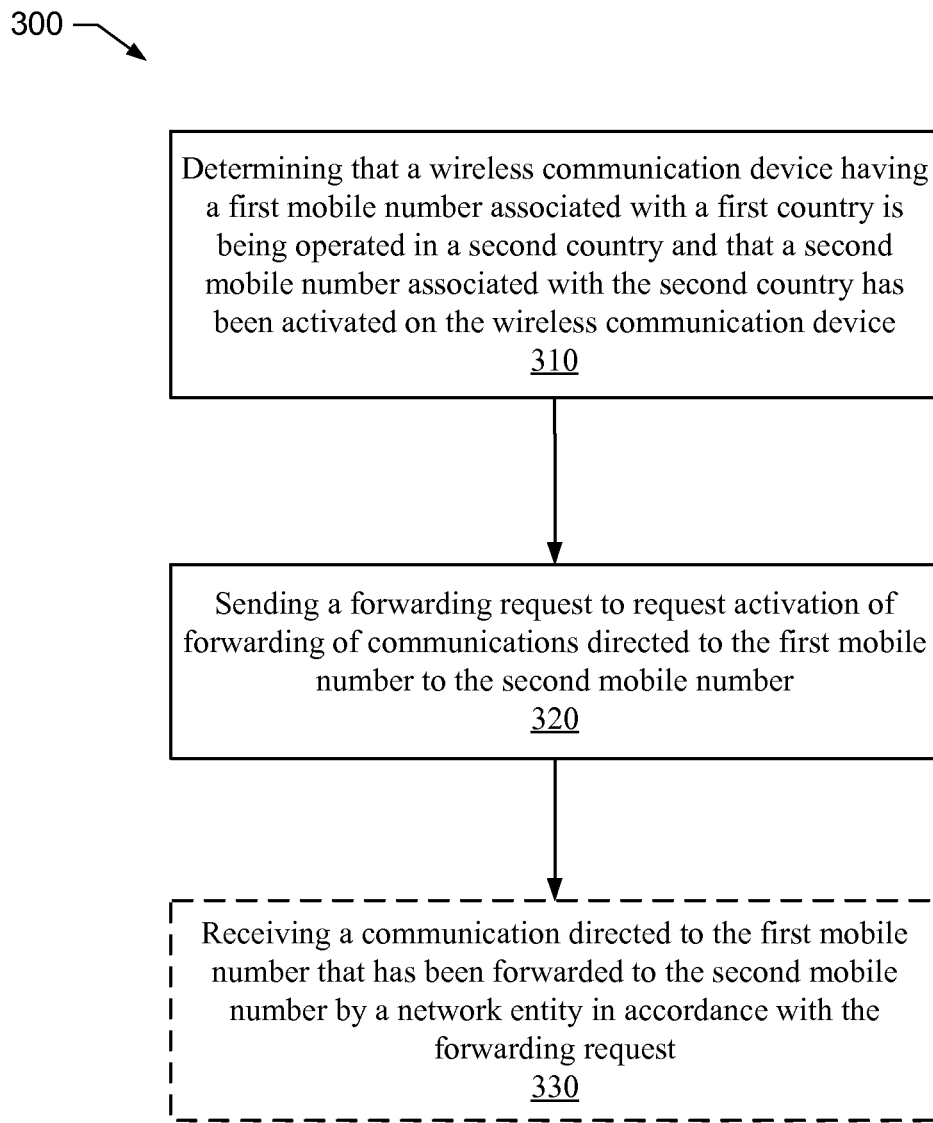
FIG. 3 illustrates a flowchart according to an example method for setting up communications forwarding in an international roaming scenario according to some example embodiments.

FIG. 3 illustrates a flowchart according to an example method for setting up communications forwarding in an international roaming scenario according to some example embodiments. In this regard, FIG. 3 illustrates operations that can be performed at a wireless communication device 102 in accordance with some example embodiments. One or more of the processing circuitry 210, processor 212, memory 214, communication interface 216, user interface 218, or forwarding request module 220 can, for example, provide means for performing the operations illustrated in FIG. 3. Operation 300 can include determining that the wireless communication device 102, having a first telephone number associated with a first country, is being operated in a second country and that a second telephone number associated with the second country has been activated on the wireless communication device 102. Operation 310 can include sending a forwarding request to request activation of forwarding of communications directed to the first telephone number to the second telephone number. The home network 108 can be configured to forward communications directed to the first telephone number to the visited network 106 so that they can be delivered to the wireless communication device 102 via the second telephone number while forwarding is active. The method of FIG. 3 can optionally further include operation 320, which can include the wireless communication device 102 receiving a communication directed to the first telephone number that has been forwarded to the second telephone number by a network entity in accordance with the forwarding request.

In some example embodiments, one or more communication types can be selectively forwarded from the first telephone number to the second telephone number. In this regard, the wireless communication device 102 can be configured to receive a variety of communication types that can be directed to a telephone number. By way of non-limiting example, these communication types can include one or more of phone calls, text messages, voicemails, and/or other communication types. As such, a forwarding request can specify which communication type(s) are to be forwarded. In some such example embodiments, preconfigured settings, such as may be set based on user preferences, can be used to specify which communication type(s) are to be forwarded. Additionally or alternatively, in some example embodiments, a user of the wireless communication device 102 can be presented with an option via the user interface 218 to select one or more communication types for forwarding when an international roaming scenario is detected and a forwarding request can request that the user selected communication type(s) be forwarded.

Figure 4:
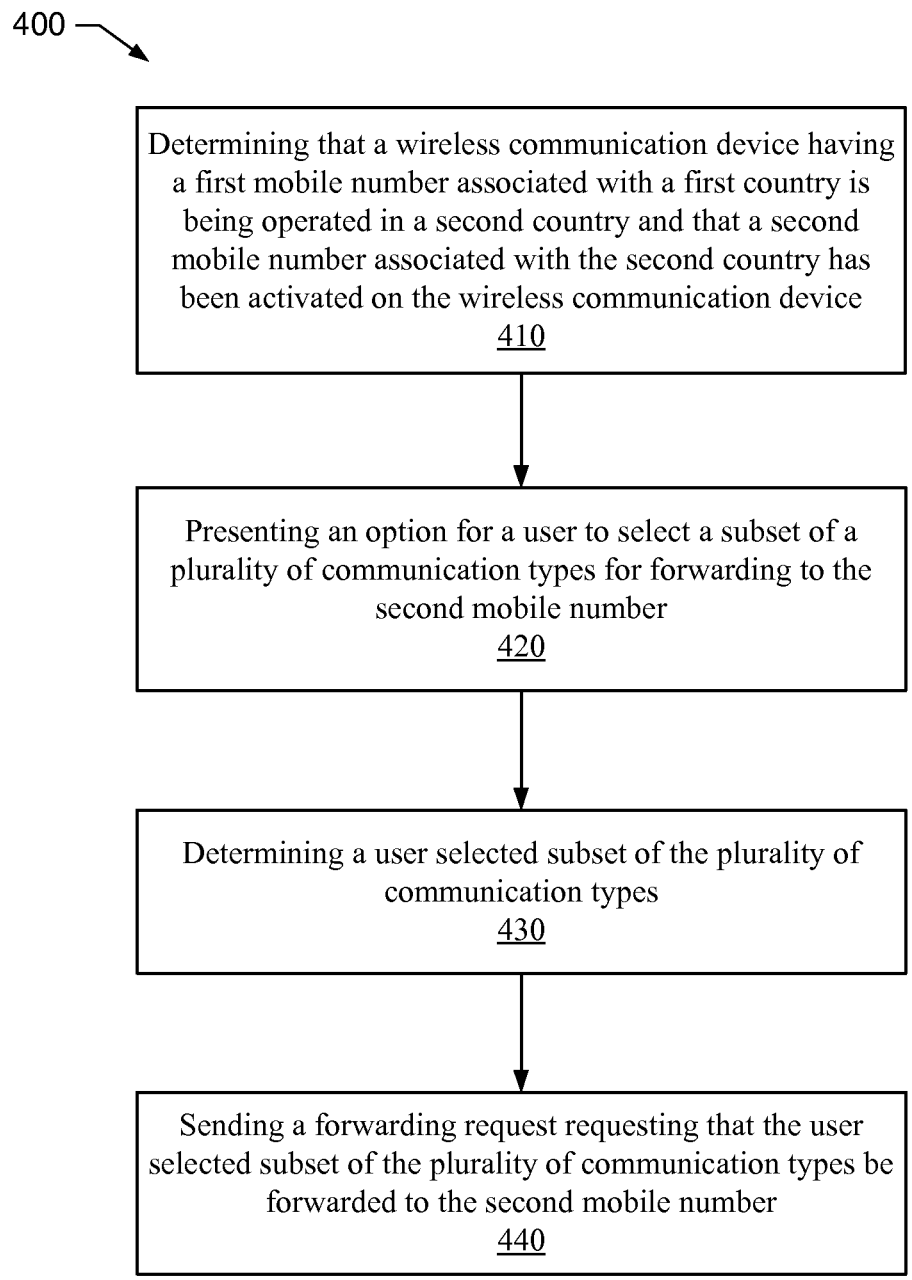
FIG. 4 illustrates a flowchart according to another example method for setting up communications forwarding in an international roaming according to some example embodiments.

FIG. 4 illustrates a flowchart according to an example method for setting up communications forwarding for one or more user selected communication types in an international roaming according to some example embodiments. In this regard, FIG. 4 illustrates operations that can be performed at a wireless communication device 102 in accordance with some example embodiments. One or more of the processing circuitry 210, processor 212, memory 214, communication interface 216, user interface 218, or forwarding request module 220 can, for example, provide means for performing the operations illustrated in FIG. 4. Operation 400 can include determining that the wireless communication device 102, having a first telephone number associated with a first country, is being operated in a second country and that a second telephone number associated with the second country has been activated on the wireless communication device 102. Operation 410 can include presenting an option for a user to select a subset of a plurality of communication types (e.g., calls, text messages, voicemails, and/or other communication types) for forwarding to the second telephone number. The option can, for example, be presented to the user via a display of the user interface 218 so that the user can select from the communication types. Operation 420 can include determining a user selected subset of the plurality of presented communication types. Operation 430 can include sending a forwarding request requesting that the user selected subset of the plurality of communication types be forwarded to the second telephone number. As such, a user selected communication type directed to the first telephone number can be forwarded to the second telephone number, while a communication type that is not selected by the user may not be.

The forwarding request module 220 can be configured to detect an international roaming scenario using one or more of a variety of techniques in various example embodiments. For example, in some embodiments, the forwarding request module 220 can be configured to determine that a network access credential having a country code associated with the second country has been activated on the wireless communication device 102 in place of a network access credential having a country code associated with the first country. The network access credential having a country code associated with the second number can, for example, be an IMSI, such as can be stored on or otherwise carried by a SIM, having a mobile country code (MCC) associated with the second country. Thus, for example, the forwarding request module 220 can be configured to detect when an embedded SIM carrying an IMSI having an MCC associated with the second country is activated in place of a SIM carrying an IMSI having an MCC associated with the first country. Additionally or alternatively, as another example, the forwarding request module 220 can be configured to detect when a first SIM card carrying an IMSI having an MCC associated with the first country is removed and a second SIM card carrying an IMSI having an MCC associated with the second country is inserted in place of the first SIM card.

Figure 5:
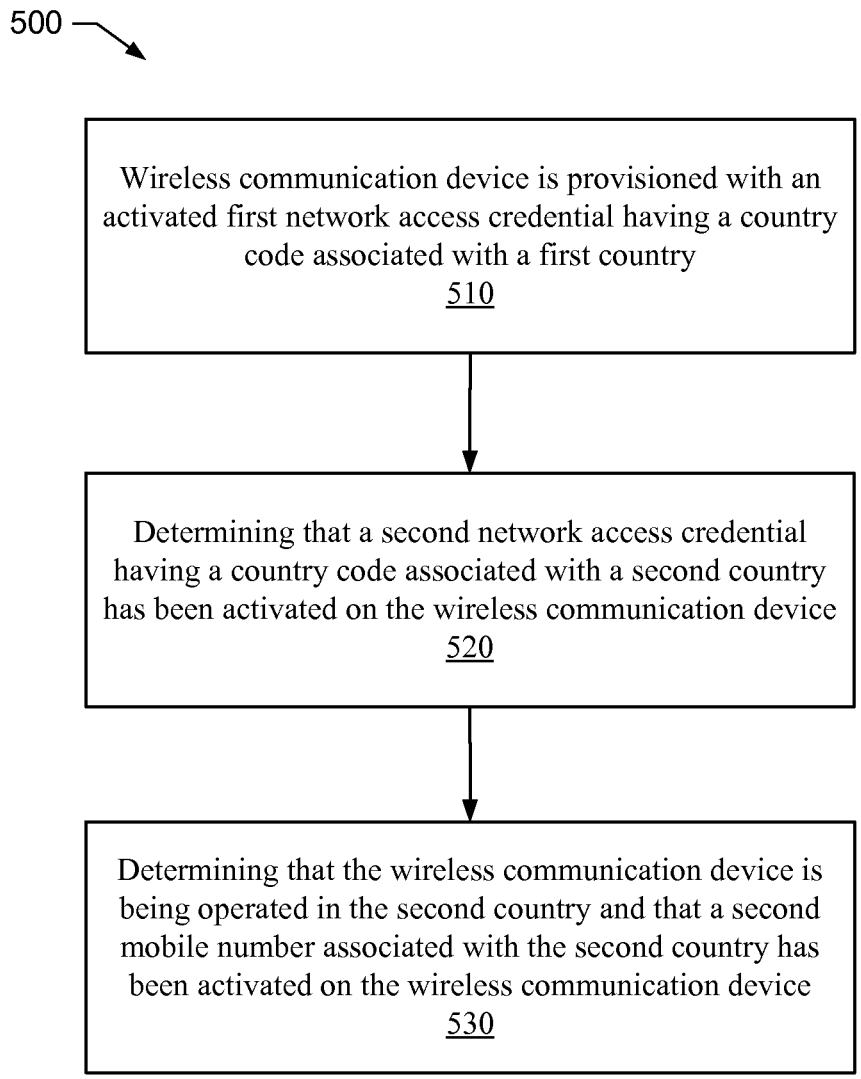
FIG. 5 illustrates a flowchart according to an example method for detecting an international roaming scenario according to some example embodiments.

FIG. 5 illustrates a flowchart according to an example method for detecting an international roaming scenario based at least in part on activation of a network access credential according to some example embodiments. In this regard, FIG. 5 illustrates operations that can be performed at the wireless communication device 102, such as attendant to performance of operation 300 and/or operation 400 as discussed above. One or more of the processing circuitry 210, processor 212, memory 214, communication interface 216, user interface 218 or forwarding request module 220 can, for example, provide means for performing the operations illustrated in FIG. 5. Operation 500 illustrates an initial state in which the wireless communication device 102 can be provisioned with an activated first network access credential having a country code associated with the first country. This network access credential can, for example, be used to access the home network 108. Operation 510 can include determining that a second network access credential having a country code associated with a second country has been activated on the wireless communication device 102. In this regard, the second network access credential can, for example, have been activated in place of the first network access credential. Operation 520 can include determining that the wireless communication device 102 is being operated in the second country and that a second telephone number associated with the second country has been activated on the wireless communication device based at least in part on the determination of operation 510.

In some example embodiments, the forwarding request module 220 can additionally or alternatively be configured to detect an international roaming scenario based on a change in location of the wireless communication device 102. In this regard, the forwarding request module 220 of some example embodiments can be configured to detect that the wireless communication device 102 has moved form the first country to the second country. This determination can be made in a variety of ways in various example embodiments. By way of non-limiting example, the forwarding request module 220 can be configured in some example embodiments to detect that the wireless communication device 102 has moved form the first country to the second country based at least in part on a position of the wireless communication device 102, such as may be determined through the Global Positioning System (GPS) or other positioning service; a location indication that can be signaled by the wireless network access point 104 or other network access point (e.g., a location that can be signaled by a cellular network, wireless local area network, and/or the like); a country code that can be associated with the visited network 106; and/or the like.

Figure 6:
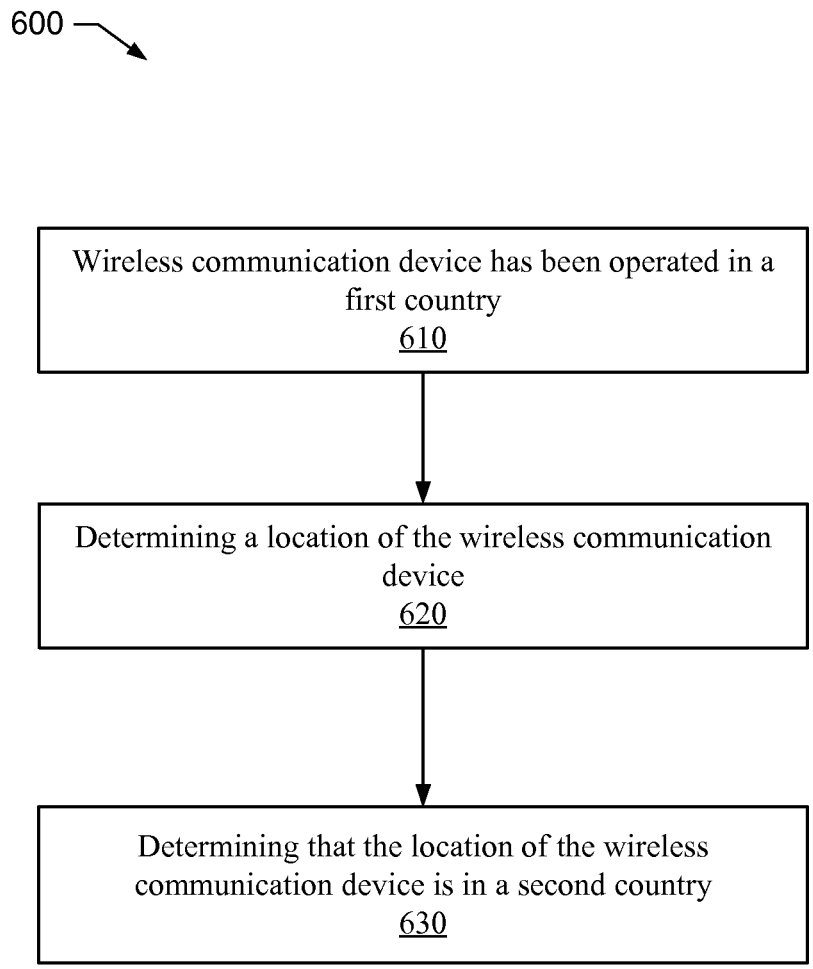
FIG. 6 illustrates a flowchart according to another example method for detecting an international roaming scenario according to some example embodiments.

FIG. 6 illustrates a flowchart according to an example method for detecting an international roaming scenario based at least in part on a change in location according to some example embodiments. In this regard, FIG. 6 illustrates operations that can be performed at the wireless communication device 102, such as attendant to performance of operation 300 and/or operation 400 as discussed above. One or more of the processing circuitry 210, processor 212, memory 214, communication interface 216, user interface 218 or forwarding request module 220 can, for example, provide means for performing the operations illustrated in FIG. 6. Operation 600 illustrates an initial state in which the wireless communication device 102 can be operated in a first country, such as on the home network 108. Operation 610 can include determining a location of the wireless communication device 102. Location determination can, for example, be performed using a satellite positioning system, such as the Global Positioning System (GPS), a location sensed form a wireless local area network, a location indicated by a serving cellular network, and/or other location determining techniques that can be available to the wireless communication device 102. Operation 620 can include determining that the location determined in operation 610 is in a second country.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for causing communications directed to a first telephone number associated with a wireless device to be forwarded to a second telephone number associated with the wireless device, the method comprising:
- determining, at the wireless device, that the wireless device has transitioned from receiving communications via a first wireless network that manages the first telephone number to receiving communications via a second wireless network that manages the second telephone number;
- responsive to determining, sending, via the second wireless network, a forwarding request from the wireless device to the first wireless network, wherein the forwarding request causes the first wireless network to forward to the second wireless network communications that are directed to the first telephone number; and
- receiving, at the wireless device and via the second wireless network, a communication directed to the first telephone number that has been forwarded to the second telephone number in accordance with the forwarding request.

2. The method of claim 1, wherein determining that the wireless device has transitioned from receiving communications via the first wireless network that manages the first telephone number to receiving communications via the second network that manages the second telephone number comprises identifying that the second telephone number is associated with a second country that is different from a first country associated with the first telephone number.

3. The method of claim 2, wherein each of the first telephone number and the second telephone number is associated with a different mobile country code (MCC).

4. The method of claim 2, further comprising using location data associated with the wireless device to determine that the wireless device is operating in the second country.

5. The method of claim 1, further comprising:
- presenting to a user of the wireless device an option to select at least one type of communication from a plurality of types of communications to be forwarded from the first telephone number to the second telephone number; and
- updating the forwarding request to reflect the selected at least one type of communication.

6. The method of claim 5, wherein the plurality of types of communications includes phone calls, text messages, and voicemail.

7. A wireless device, comprising:
- at least one wireless communication interface; and
- a processor, wherein the processor is configured to cause the wireless device to:
  - determine, at the wireless device, that the wireless device has transitioned from using a first subscriber identity module (SIM) card associated with a first telephone number to using a second SIM card associated with a second telephone number;
  - responsive to determining, send, via a second wireless network that manages the second telephone number, a forwarding request from the wireless device to a first wireless network that manages the first telephone number, wherein the forwarding request is sent using the at least one wireless communication interface and causes the first wireless network to forward to the second wireless network communications that are directed to the first telephone number; and
  - receive, at the wireless device and via the second wireless network, a communication directed to the first telephone number that has been forwarded to the second telephone number in accordance with the forwarding request.

8. The wireless device of claim 7, wherein each of the first SIM card and the second SIM card is further associated with a different internet mobile subscriber identity (IMSI) used by the wireless device for wireless access.

9. The wireless device of claim 7, wherein the wireless device determines that the wireless device has transitioned from using the first SIM card associated with the first telephone number to using the second SIM card associated with the second telephone number by identifying that the second telephone number is associated with a second country that is different from a first country associated with the first telephone number.

10. The wireless device of claim 9, wherein each of the first telephone number and the second telephone number is associated with a different mobile country code (MCC).

11. The wireless device of claim 9, wherein the processor is further configured to cause the wireless device to use location data associated with the wireless device to determine that the wireless device is operating in the second country.

12. The wireless device of claim 7, wherein the processor is further configured to cause the wireless device to:
- present to a user of the wireless device an option to select at least one type of communication from a plurality of types of communications to be forwarded from the first telephone number to the second telephone number; and
- update the forwarding request to reflect the selected at least one type of communication.

13. The wireless device of claim 12, wherein the plurality of types of communications includes phone calls, text messages, and voicemail.

14. A non-transitory computer readable storage medium configured to store instructions that, when executed by a processor included in a wireless device, cause the wireless device to carry out steps that include
- determining, at the wireless device, that the wireless device has transitioned from receiving communications via a first wireless network that manages a first telephone number to receiving communications via a second wireless network that manages a second telephone number;
- responsive to determining, sending, via the second wireless network, a forwarding request from the wireless device to the first wireless network, wherein the forwarding request causes the first wireless network to forward to the second wireless network communications that are directed to the first telephone number; and
- receiving, at the wireless device and via the second wireless network, a communication directed to the first telephone number that has been forwarded to the second telephone number in accordance with the forwarding request.

15. The non-transitory computer readable storage medium of claim 14, wherein a first subscriber identity module (SIM) card is associated with the first telephone number and a second SIM card is associated with the second telephone number, and the second SIM card is being used by the wireless device.

16. The non-transitory computer readable storage medium of claim 14, wherein determining that the wireless device has transitioned from receiving communications via the first wireless network that manages the first telephone number to receiving communications via the second network that manages the second telephone number comprises identifying that the second telephone number is associated with a second country that is different from a first country associated with the first telephone number.

17. The non-transitory computer readable storage medium of claim 16, wherein each of the first telephone number and the second telephone number is associated with a different mobile country code (MCC).

18. The non-transitory computer readable storage medium of claim 16, further comprising instructions that, when executed by the processor, cause the wireless device to use location data associated with the wireless device to determine that the wireless device is operating in the second country.

19. The non-transitory computer readable storage medium of claim 14, further comprising instructions that, when executed by the processor, cause the wireless device to:
present to a user of the wireless device an option to select at least one type of communication from a plurality of types of communications to be forwarded from the first telephone number to the second telephone number; and
update the forwarding request to reflect the selected at least one type of communication.

20. A wireless device, comprising:
at least one wireless communication interface; and
a processor, wherein the processor is configured to cause the wireless device to:
determine, at the wireless device, that the wireless device has transitioned from receiving communications via a first wireless network that manages a first telephone number to receiving communications via a second wireless network that manages a second telephone number;
responsive to determining, send, via the second wireless network, a forwarding request from the wireless device to the first wireless network, wherein the forwarding request is sent using the at least one wireless communication interface and causes the first wireless network to forward to the second wireless network communications that are directed to the first telephone number; and
receive, at the wireless device and via the second wireless network, a communication directed to the first telephone number that has been forwarded to the second telephone number in accordance with the forwarding request.

21. The wireless device of claim 20, wherein:
the first wireless network is a home network of the wireless device and operates in a first country; and
the second wireless network is a visited network of the wireless device and operates in a second country that is different from the first country.

22. The wireless device of claim 21, wherein the processor is further configured to cause the wireless device to:
present to a user of the wireless device an option to select at least one type of communication from a plurality of types of communications to be forwarded from the first telephone number to the second telephone number; and
update the forwarding request to reflect the selected at least one type of communication.

* * * * *